United States Patent
Cifone et al.

(10) Patent No.: US 11,163,612 B2
(45) Date of Patent: Nov. 2, 2021

(54) MULTI-TIER COORDINATION OF DESTRUCTIVE ACTIONS

(71) Applicant: International Business Machines Corporation, Armonk, NY (US)

(72) Inventors: Bart R. Cifone, Marina del Rey, CA (US); Alan M. Frazier, Palatine, IL (US); Patrick A. Tamborski, Chicago, IL (US); Sanjaya Kumar, South Elgin, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 463 days.

(21) Appl. No.: 16/017,300

(22) Filed: Jun. 25, 2018

(65) Prior Publication Data
US 2019/0391853 A1   Dec. 26, 2019

(51) Int. Cl.
*G06F 9/50* (2006.01)
*G06F 9/46* (2006.01)
*H04L 29/08* (2006.01)

(52) U.S. Cl.
CPC ............ *G06F 9/5083* (2013.01); *G06F 9/466* (2013.01); *H04L 67/1097* (2013.01)

(58) Field of Classification Search
CPC ...... G06F 9/466; G06F 9/4881; G06F 9/5011; G06F 9/5083; G06F 9/546; H04L 41/0836; H04L 67/1095; H04L 67/1097
See application file for complete search history.

(56) References Cited

U.S. PATENT DOCUMENTS

| 5,852,724 | A | * | 12/1998 | Glenn, II | G06F 11/20 709/239 |
| 5,987,621 | A | * | 11/1999 | Duso | G06F 11/2023 348/E5.008 |
| 9,086,994 | B2 | | 7/2015 | Resch | |
| 9,141,297 | B2 | | 9/2015 | Resch | |
| 9,292,212 | B2 | | 3/2016 | Kazi et al. | |
| 2002/0166031 | A1 | * | 11/2002 | Chen | G06F 12/0813 711/141 |
| 2009/0150459 | A1 | * | 6/2009 | Blea | G06F 16/27 |

(Continued)

OTHER PUBLICATIONS

Anonymously; Method and System for Environment Aware Maintenance Task Optimization based on Machine Learning; ip.com/IPCOM/000250426D; Jul. 13, 2017; 5 pgs.

(Continued)

*Primary Examiner* — Jorge A Chu Joy-Davila
(74) *Attorney, Agent, or Firm* — Anthony England; Andrew D. Wright; Roberts Calderon Safran & Cole, P.C.

(57) ABSTRACT

A distributed storage network (DSN) processes storage unit maintenance tasks on multiple tiers within the DSN. A master storage unit coordinates pending maintenance tasks when a DSN management unit, originally processing the pending maintenance tasks, changes its status to offline. The method includes the master storage unit aggregating pending maintenance tasks from corresponding DSN storage units into an ordered list of maintenance tasks, facilitating, based on the ordered list of maintenance tasks, coordination of a next maintenance task with a corresponding storage unit and directing execution of the next maintenance task by the corresponding storage unit.

20 Claims, 7 Drawing Sheets

(56) References Cited

U.S. PATENT DOCUMENTS

2017/0090824 A1 3/2017 Tamborski
2018/0103105 A1* 4/2018 Dhuse ................ G06F 11/1092

OTHER PUBLICATIONS

Anonymously; A System Method for Maintaining in Memory Data Objects with No Loss of Data Availability; ip.com/IPCOM/000226975D; Apr. 29, 2013; 7 pgs.

Anonymously; Smart system & method to efficiently load balance the workload in microservice's architectures & to improve performance; ip.com/IPCOM/000249179D; Feb. 8, 2017; 8 pgs.

He, B. et al.; Detecting a Utilization Imbalance Between Dispersed Storage Units; International Industrial Informatics and Computer Engineering Conference (IIICEC 2015); 2015; 4 pgs.

* cited by examiner

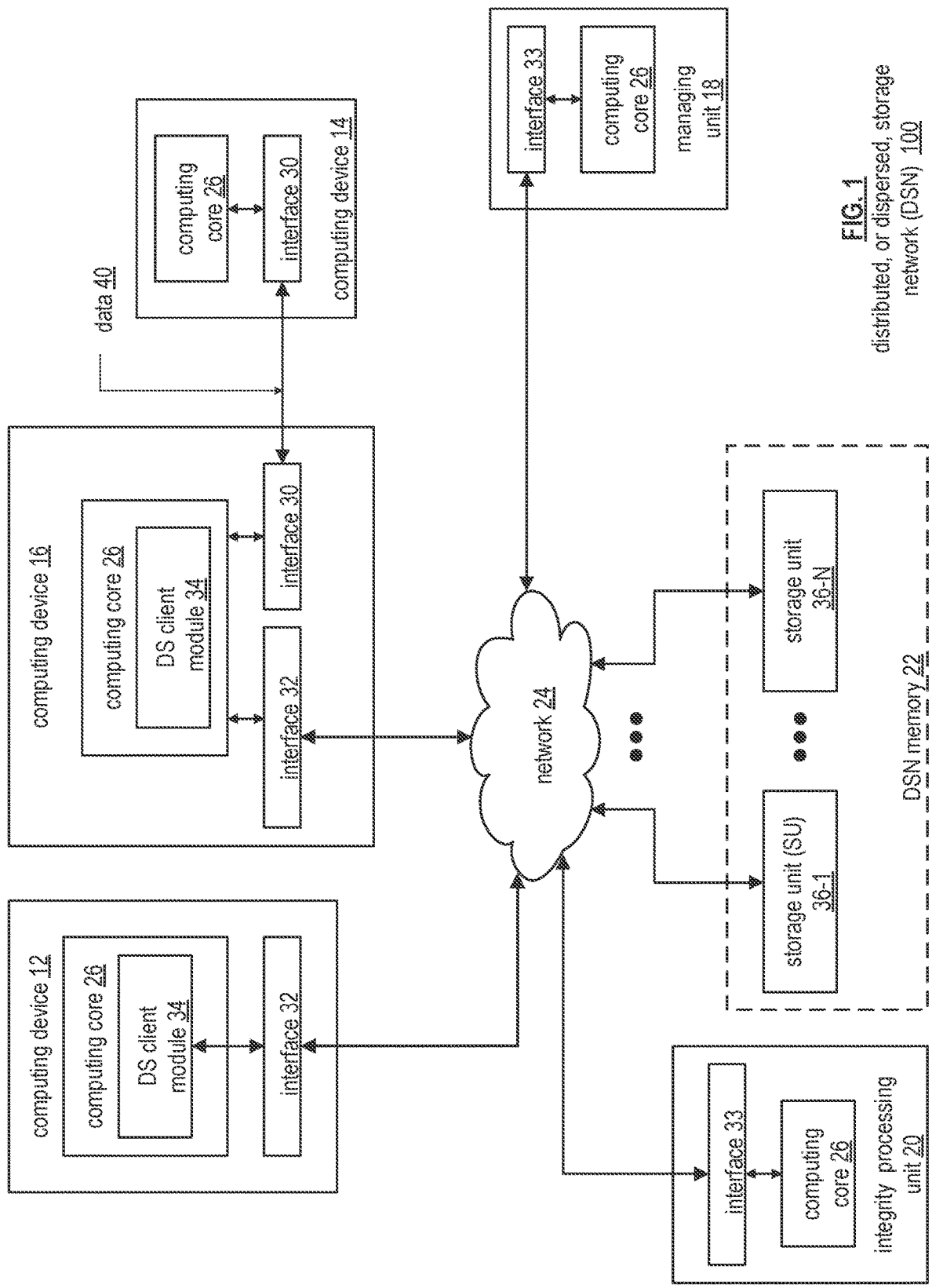

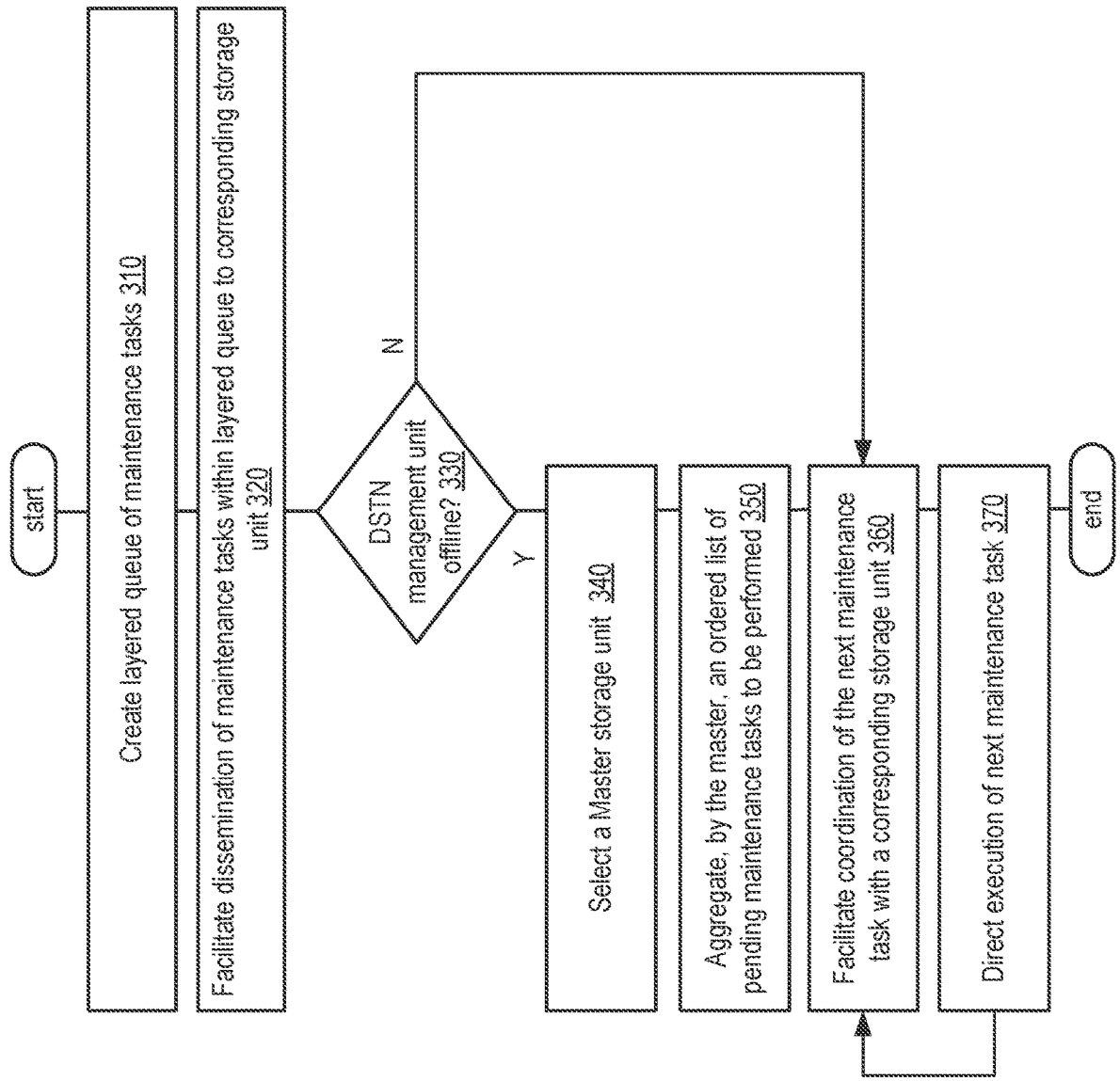

MULTI-TIER COORDINATION OF DESTRUCTIVE ACTIONS

BACKGROUND

This present application relates to dispersed storage systems, and more specifically, to coordination of tasks for dispersed/distributed storage and task processing networks (DSTN).

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

SUMMARY

According to one embodiment, a distributed storage network (DSN) processes storage unit maintenance tasks on multiple tiers within the DSN. A master storage unit coordinates pending maintenance tasks when a DSN management unit, originally processing the pending maintenance tasks, changes its status to offline. The method includes the master storage unit aggregating pending maintenance tasks from corresponding DSN storage units into an ordered list of maintenance tasks, facilitating, based on the ordered list of maintenance tasks, coordination of a next maintenance task with a corresponding storage unit and directing execution of the next maintenance task by the corresponding storage unit.

BRIEF DESCRIPTION OF THE DRAWINGS

FIG. 1 is a schematic block diagram of an embodiment of a dispersed or distributed storage network (DSN) in accordance with the present invention;

FIG. 3 is a flow diagram illustrating multi-tier coordination of tasks according to various embodiments of the present invention;

DETAILED DESCRIPTION

Figure 2A:
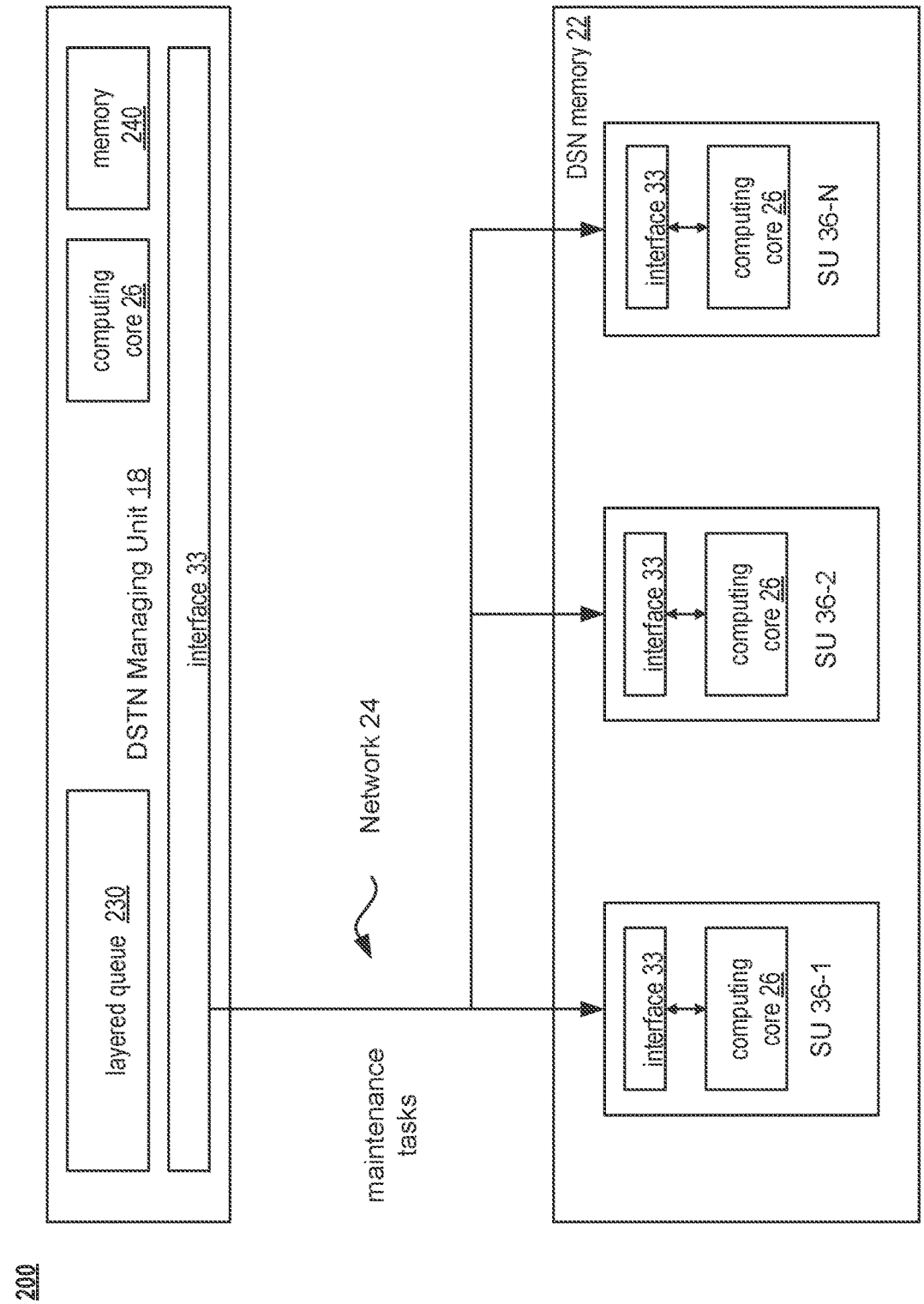
FIG. 2A is a diagram illustrating an embodiment of a master storage unit to implement tasks according to various embodiments of the present invention.

According to an embodiment of the present invention, a dispersed/distributed storage network (DSN) includes multiple distributed computing systems including DSN memories. The DSN memories include distributed storage and task processing network (DSTN) managing units. These DSTN managing units periodically initiate connections with storage units within the DSN and coordinate tasks based on a layered queue of tasks. However, if the DSTN goes offline for any reason, a potential exists for destructive task implementations outside of the originally intended layered queue.

FIG. 1 is a schematic block diagram of an embodiment of a dispersed, or distributed, storage network (DSN) 100 that includes a plurality of computing devices 12-16, a DSTN managing unit 18 (managing unit), an integrity processing unit 20, and a DSN memory 22. The components of the DSN 100 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core or components thereof and a plurality of memory devices for storing dispersed error encoded data.

Each of the computing devices 12-16, the DSTN managing unit 18, and the integrity processing unit 20 include a computing core 26 (processing circuitry) and memory (not shown), which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the DSTN managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/ or any other type of connection to/from the network 24) between computing devices 12 and 16 and the DSN memory 22. As yet another example, interface 33 supports a communication link for each of the DSTN managing unit 18 and the integrity processing unit 20 to the network 24.

Computing devices 12 and 16 include a dispersed storage (DS) client module 34, which enables the computing device to dispersed storage error encode and decode data. In this example embodiment, computing device 16 functions as a dispersed storage processing agent for computing device 14. In this role, computing device 16 dispersed storage error encodes and decodes data on behalf of computing device 14.

With the use of dispersed storage error encoding and decoding, the DSN is tolerant of a significant number of storage unit failures (the number of failures is based on parameters of the dispersed storage error encoding function) without loss of data and without the need for a redundant or backup copies of the data. Further, the DSN stores data for an indefinite period of time without data loss and in a secure manner (e.g., the system is very resistant to unauthorized attempts at accessing the data). When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In an example, the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol. The computing device 12 or 16 then disperse storage error encodes a data segment using the selected encoding function (e.g., Cauchy Reed-Solomon) to produce a set of encoded data slices.

The computing device also creates a slice name (SN) for each encoded data slice (EDS) in the set of encoded data slices. The slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

Figure 2B:
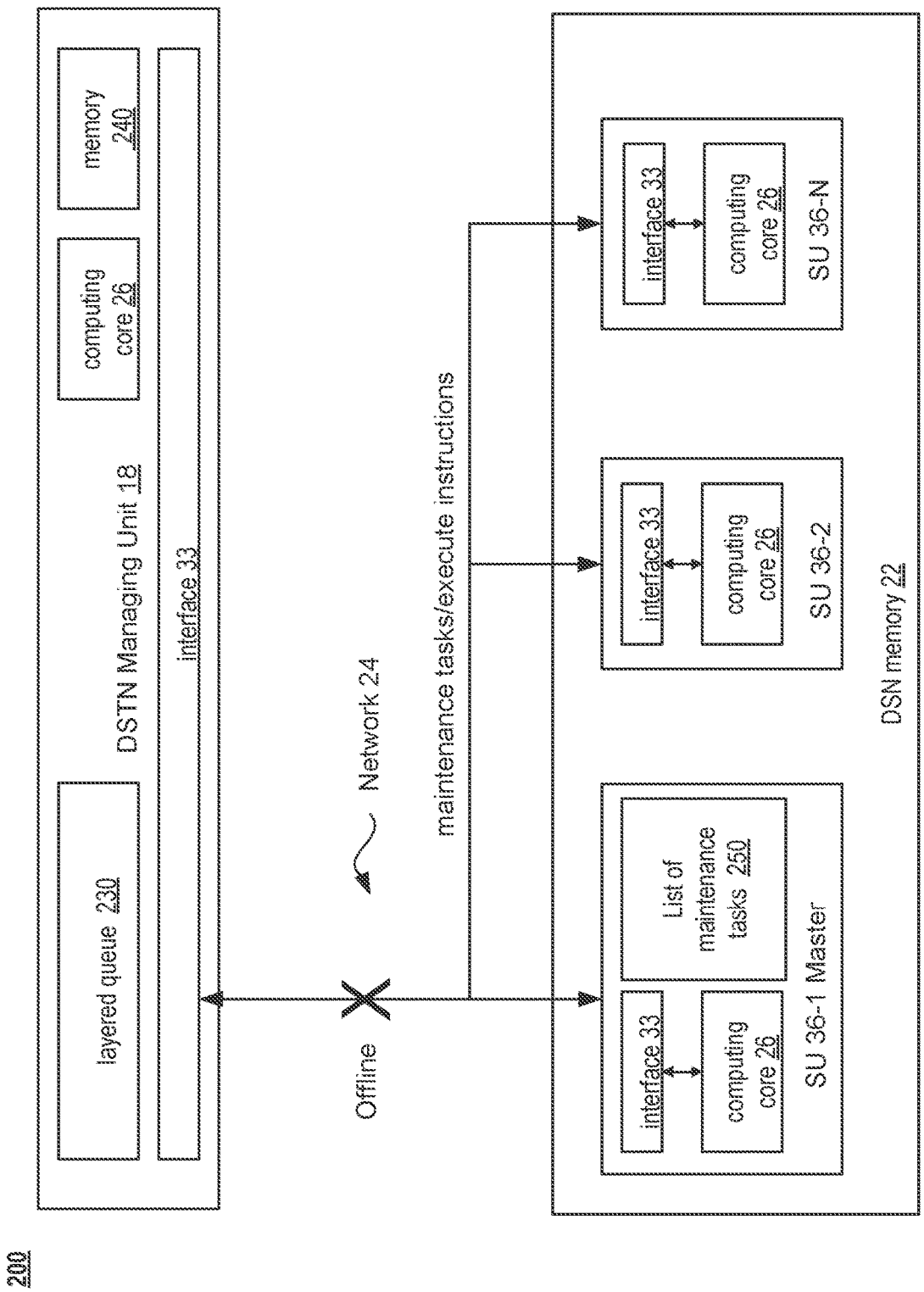
FIG. 2B is another diagram illustrating an embodiment of a master storage unit to implement tasks according to various embodiments of the present invention.

FIGS. 2A and 2B collectively illustrate an embodiment 200 of a master storage unit to implement storage unit maintenance tasks according to various embodiments of the present invention. Certain tasks performed by storage units of a DSN, including some maintenance tasks, may adversely impact the integrity of the DSN (e.g., cause irrecoverable data loss or unavailability of critical services) if performed at the wrong time. Such tasks may include, but are not limited to, updating hardware, reboot operations, process restarts, installing software patches, and other "potentially destructive" tasks that result in temporary unavailability of a storage unit. Novel methodologies are described herein for coordinated execution of these types of tasks when a status of a DSTN management unit 18 switches to offline.

As shown in FIG. 2A, layered queue 230 represents a data structure that maintains an order of all elements (e.g., maintenance tasks) while simultaneously maintaining order for any particular characteristic of each element. For example, each element in the layered queue may have a color but can be traversed by just visiting the elements with the color 'red'. The DSTN management unit 18 can use such a structure to maintain a list of destructive tasks in a DSTN memory while keeping each unique task separate from each other from the perspective of other components. While functionally shown as a separate element in DSTN management unit 18, layered queue 230 would typically be stored in memory 240 of the DSTN management unit 18. Also, while DSTN management unit 18 is shown functionally as a separate element communicating across network 24, DSTN management unit 18 could, in one embodiment, be part of one or more of storage units (SU) 36-1 through 36-N. In addition, while described for maintenance tasks, other DSN tasks to be performed by the storage units, as directed by the DSTN managing unit, could be substituted herein without departing from the scope of the present invention.

As an example, maintenance task coordination may involve an automated process that operates to ensure proper function of the DSN memory while performing tasks (e.g., storage upgrades) on a desired number of storage units. When such tasks are to be performed, a selection of associated storage units is added (e.g., by a DSTN managing unit 18) to an ordered list (layered queue 230) corresponding to the action(s) to be performed. Queues which have an entry are analyzed to determine if the storage unit identified at the top of each such queue can be occupied or otherwise made unavailable during performance of the associated task without compromising the reliability, for example, of a storage set/vault in which the storage unit participates. If so, the relevant queue entry is deleted, and the task is performed. If not, the relevant queue entry is moved to another location in the queue (e.g., the end of the queue) and the task is re-evaluated at a later time. Processing then continues until each queue is empty or until every storage device has been moved to the end of a queue at least once without progress. If no progress has been made based on the unavailability of storage units, further processing may be delayed until the availability of one or more storage units is restored.

In an example of operation of initiating a maintenance task, for each maintenance task type of one or more maintenance tasks to be performed on the storage units of the DSN, the DSTN managing unit 18 generates an ordered list (e.g., a queue) of one or more storage units to perform the maintenance task of the maintenance task type to produce one or more ordered lists. A maintenance task may include one or more of updating hardware, rebooting software, restarting a particular software process, performing an upgrade, installing a software patch, loading a new software revision, performing an off-line test, prioritizing tasks associated with an online test, etc. As an example of generating the ordered list, the DSTN managing unit 18 maintains a queue for the maintenance task type, where each entry of the queue is associated with a unique storage unit and where a first ordered list entry corresponds to a top queue entry (e.g., a next entry to come out of the queue when the queue is accessed to retrieve a next queue entry).

For a given ordered list, the DSTN managing unit 18 determines whether to initiate execution of a maintenance task by a corresponding storage unit for a first ordered list entry (e.g., top queue entry). The determining includes one or more of selecting the top queue entry, identifying a corresponding storage unit associated with the selected entry, predicting the impact of performing the maintenance task of the maintenance task type associated with the given ordered list, initiating/indicating to perform the maintenance task when the predicted impact compares favorably to an impact threshold level, and indicating not to perform the maintenance task when the predicted impact compares unfavorably to the impact threshold level.

Predicting the impact of performing a task may include one or more of identifying one or more storage sets associated with the storage unit, obtaining availability information regarding other storage units associated with the one or more storage sets (e.g., receiving status information from a DS client module 34 or a controller of each relevant storage unit), and estimating a performance and/or storage reliability level should the storage unit be instructed to execute the maintenance task. For example, the DSTN managing unit 18 determines not to initiate execution of a maintenance task for storage unit SU 36-2 when a number of other needed storage units of a storage set are unavailable and a resulting availability level of storage units for the storage set is less than (or compares unfavorably to) a desired storage unit availability threshold level.

For a given ordered list, the DSTN managing unit 18 determines whether to initiate execution of the maintenance task by a storage unit corresponding to a first ordered list entry. For example, the DSTN managing unit 18 selects a top queue entry, identifies a corresponding storage unit, predicts impact of performing the maintenance task of the maintenance task type associated with the given ordered list, and indicates to perform the maintenance task when the predicted impact compares favorably to an impact threshold level. When the processing module determines not to execute the maintenance task, the first-ordered list entry is moved to another location within the given ordered list. Moving the entry includes identifying a position and moving the entry to the identified position (e.g., to the bottom). The method then by selecting a next ordered list or determines to continue processing of entries in the first ordered list. When the maintenance task is to be executed, a maintenance request is sent to the corresponding storage unit for the maintenance task and the task deleted from the given ordered list.

As previously shown in FIG. 2A, DSTN management unit 18 generates the initial list of tasks and disseminated those tasks to the various storage units. However, as shown in FIG. 2B, the DSN management unit 18 can then go offline (even permanently), and the tasks will eventually complete with the same assurances as if the DSTN management unit 18 was online.

In this embodiment, DSTN management unit 18 unit is now offline preventing layered queue 230 from being implemented by DSTN management unit 18. A typical layered queue would traditionally operate under the assumption that there always exists an on-line management application or DSTN management unit 18 organizing tasks (such as maintenance). However, using a model where master storage unit 36-1 can tabulate storage pool health, it can also take over the task organizing logic currently performed by the layered queue 230 in the DSTN management unit 18. In other words, the responsibility to determine whether the next maintenance task (e.g., an upgrade) can proceed is shifted from DSTN managing unit 18 to master SU 36-1. Master SU 36-1 assembles a complete aggregated view of current pending maintenance tasks (list of maintenance tasks 250) from storage units SU 1-N required to determine whether execution can proceed.

It is within the scope of the technology described herein that any of the storage units (SU) 36-1 through 36-N could function as a master or, alternatively, that a plurality of the storage units serve as master, either simultaneously with coordination therebetween or consecutively. In one embodiment, a master storage unit is selected based on the storage unit that executes a first maintenance task (or first destructive maintenance task) in the ordered list of maintenance tasks. In addition, the DSTN management unit 18 being offline does not prevent an operator from getting a status about the current maintenance tasks from the master as a master is also chosen based on having a same state as the DSTN managing unit 18 in order to effectively orchestrate tasks.

FIG. 3 is a flow diagram illustrating multi-tier coordination of tasks according to various embodiments of the present invention. The method 300 operates in step 310, where DSN management unit 18 creates a layered queue (ordered list) of maintenance tasks (e.g., upgrades, storage expansion, removing storage, moving data slices, or deleting data slices, etc.). The method 300 then continues in step 320 by facilitating dissemination of individual maintenance tasks within the layered queue to corresponding storage units (SU 36 (1-N)) executing these maintenance tasks.

The method 300 then continues in step 330 by detecting if a status of DSTN management unit 18 is offline. If not, in step 360, DSTN management unit 18 is configured to facilitate coordination of the next maintenance task with a corresponding storage unit and then, in step 370, direct (e.g., a message or command) execution of the next maintenance task by the corresponding storage unit. Steps 360 and 370 are repeated until all pending maintenance tasks have been completed or no additional pending tasks can be completed (e.g., if storage units are unavailable to execute specific tasks such as destructive maintenance tasks).

However, if in step 330, the status of DSTN management unit 18 is offline, a master storage unit is selected in step 340. In one embodiment, a master storage unit is selected based on the storage unit that executes a first maintenance task (or first destructive maintenance task) in the ordered list of remaining maintenance tasks (pending). In addition, the master is also chosen based on having a same state as the DSTN managing unit 18 in order to effectively orchestrate tasks.

The method then continues in step 350, where the selected master storage unit aggregates an ordered list of remaining (pending) maintenance tasks from the original layered queue. The method continues with step 360, where the master is now configured to facilitate coordination of the next maintenance task with a corresponding storage unit and then, in step 370, these maintenance tasks are executed by the corresponding storage unit (as directed by the master (e.g., a message or command). Steps 360 and 370 are repeated until all tasks have been completed or no more tasks can be completed (e.g., if storage units are unavailable to execute specific tasks such as destructive maintenance tasks).

Also, at any time, if DSTN managing unit 18 comes back online, it can take control and coordinate any pending maintenance tasks not already executed using the techniques as described above.

Figure 4:
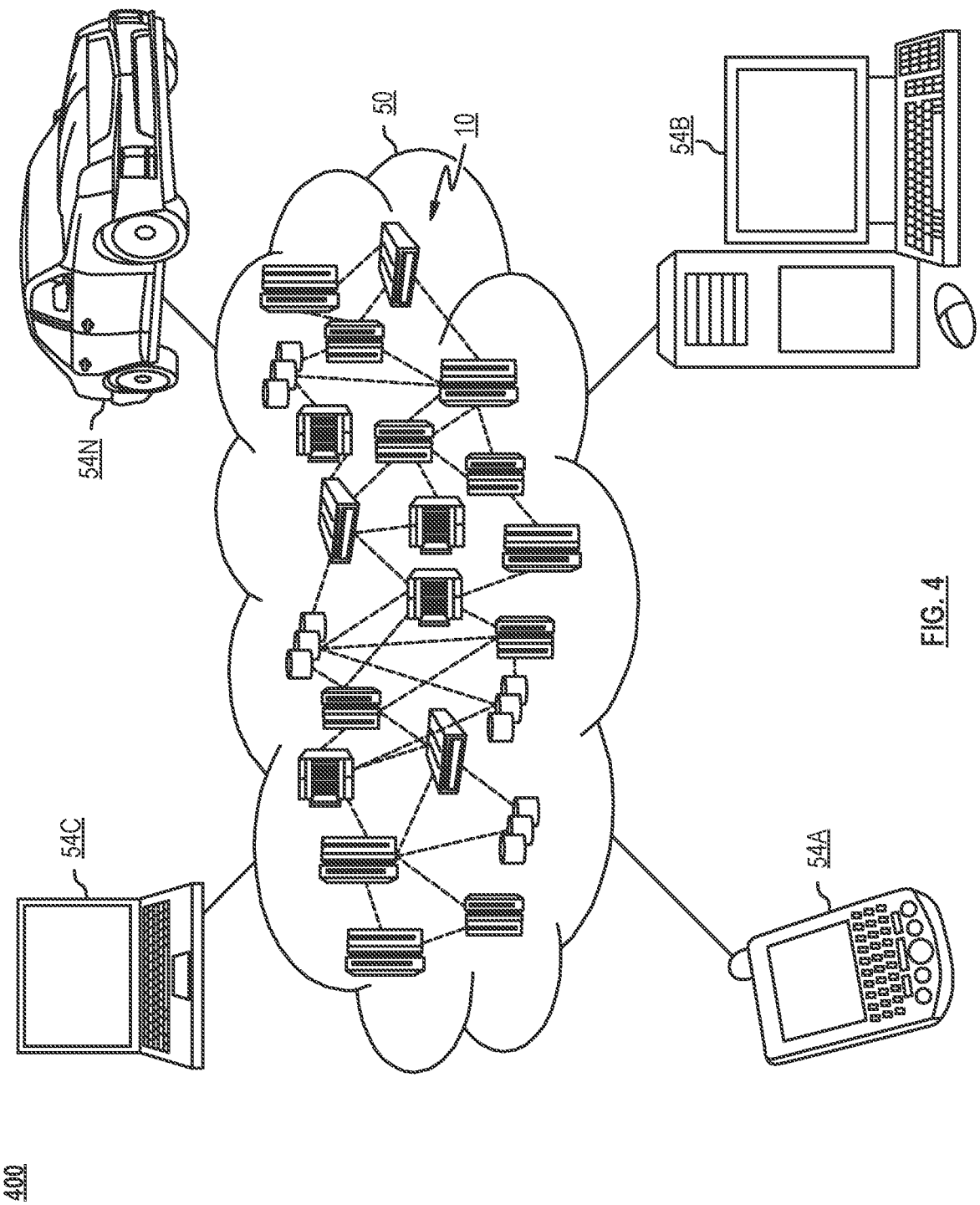
FIG. 4 depicts a cloud computing environment according to various embodiments of the present invention.

FIG. 4 depicts a cloud computing environment 50 according to various embodiments of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
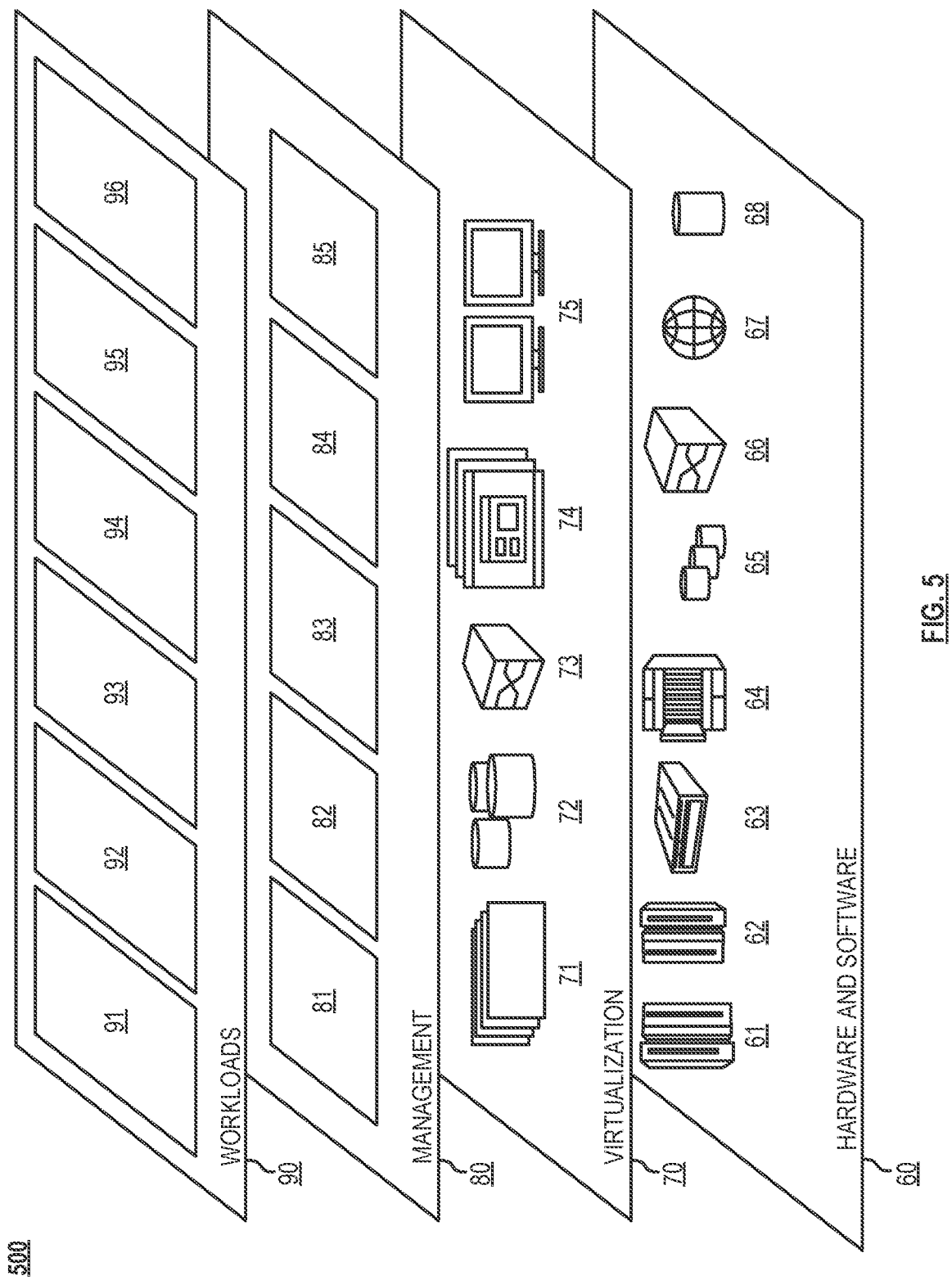
FIG. 5 depicts abstraction model layers according to various embodiments of the present invention.

FIG. 5 depicts abstraction model layers according to various embodiments of the present invention. Referring now to FIG. 5, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68. In some embodiments, one or more hardware components can be implemented by utilizing the computing device 701 of FIG. 7.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication system navigation history tracking, processing, and operations 96.

Figure 6:
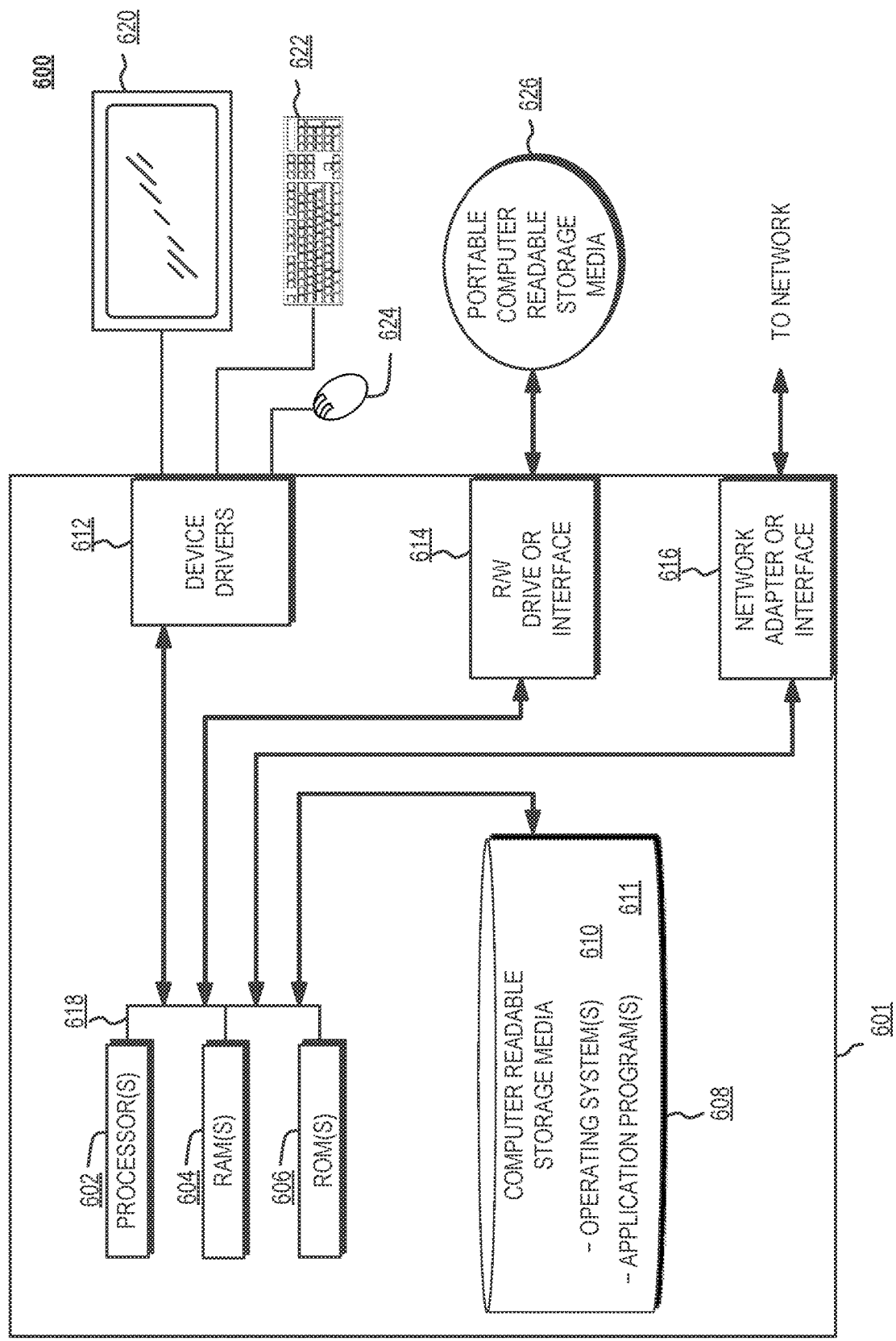
FIG. 6 depicts a block diagram of a computing device according to various embodiments of the present invention.

FIG. 6 depicts a block diagram 600 of a computing device according to various embodiments of the present invention. FIG. 6 depicts a block diagram of components of a computing device 601, which can be utilized to implement some or all of the cloud computing nodes 10, some or all of the computing devices 54A-N of FIG. 4, and/or to implement other computing devices described herein in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 601 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610 and/or application programs 611, such as network application server software 67 and database software 68, are stored on one or more of the computer readable storage media 708 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 601 can also include a R/W drive or interface 614 to read from and write to one or more portable computer readable storage media 626. Application programs 611 on computing devices 601 can be stored on one or more of the portable computer readable storage media 626, read via the respective R/W drive or interface 614 and loaded into the respective computer readable storage media 608.

Computing device 601 can also include a network adapter or interface 616, such as a TCP/IP adapter card or wireless communication adapter. Application programs 611 on computing devices 54A-N can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device 601 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A storage unit of a distributed storage network (DSN) comprises:
    an interface configured to interface and communicate with a communication system;
    memory that stores operational instructions; and
    processing circuitry operably coupled to the interface and to the memory, wherein the processing circuitry is configured to execute the operational instructions to:
        detect an offline status of a distributed storage and task processing network (DSTN) task management unit;
        select a first storage unit from a plurality of associated storage units, the first storage unit capable of tabulating storage pool health and capable of taking over task organizing logic performed by the task management unit;
        aggregate, by the first storage unit, pending maintenance tasks of the associated storage units into an ordered list of pending maintenance tasks, the first storage unit being a storage unit that executes a first maintenance task in the ordered list of pending maintenance tasks;
        facilitate, by the first storage unit based on the ordered list of pending maintenance tasks, coordination of a next maintenance task of the ordered list of pending maintenance tasks with a corresponding one of the associated storage units, the next maintenance task being a next maintenance task to be executed;
        determine, by the first storage unit, to perform the next maintenance task as a result of a predicted impact of performing the next maintenance task being less than an impact threshold, wherein the predicted impact comprises an estimated storage reliability level resulting from executing the next maintenance task; and
        direct, by the first storage unit, execution of the next maintenance task by the corresponding one of the associated storage units.

2. The storage unit of claim 1, wherein the direct execution of the next maintenance task by the corresponding one of the associated storage units is performed by sending a message or command to the corresponding one of the associated storage units.

3. The storage unit of claim 1, wherein the processing circuitry is further configured to execute the operational instructions to repeat:
    facilitate, by the first storage unit based on the ordered list of pending maintenance tasks, coordination of a next maintenance task of the ordered list of pending maintenance tasks with a corresponding storage unit; and
    direct, by the first storage unit, execution of the next maintenance task by the corresponding storage unit until all of the pending maintenance tasks have been completed or no additional pending maintenance tasks can be completed.

4. The storage unit of claim 3, wherein the no additional pending maintenance tasks can be completed reflects one or more storage units being unavailable to execute one or more pending maintenance tasks.

5. The storage unit of claim 3, wherein the no additional pending maintenance tasks can be completed reflects a storage unit expected to execute one or more destructive maintenance tasks being unavailable.

6. The storage unit of claim 1, wherein the pending maintenance tasks are any of: upgrades, storage expansion, removing storage, moving data slices, or deleting data slices.

7. The storage unit of claim 1, wherein the pending maintenance tasks include one or more of: a patch, a full upgrade, or a configuration change.

8. The storage unit of claim 1, wherein the pending maintenance task reflects one or more specific steps to be executed by the storage unit.

9. The storage unit of claim 1, wherein the processing circuitry is further configured to execute the operational instructions to:
    detect an online status of a task management unit;

facilitate, based on pending ones of the ordered list of maintenance tasks, coordination of a next maintenance task with a corresponding storage unit; and direct execution of the next maintenance task by the corresponding storage unit.

10. A method for execution by a distributed storage network (DSN) storage unit, the method comprises:

detecting an offline status of a distributed storage and task processing network (DSTN) maintenance task management unit;

selecting a first storage unit from a plurality of associated storage units, the first storage unit capable of tabulating storage pool health and capable of taking over task organizing logic performed by the task management unit;

aggregating, by the first storage unit, pending maintenance tasks from the associated DSN storage units into an ordered list of maintenance tasks,;

facilitating, by the first storage unit based on the ordered list of maintenance tasks, coordination of a next maintenance task of the pending maintenance tasks with a corresponding one of the associated storage units, the next maintenance task being a next maintenance task to be executed;

determining, by the first storage unit, to perform the next maintenance task as a result of a predicted impact of performing the next maintenance task being less than an impact threshold level, wherein the predicted impact comprises an estimated storage reliability level resulting from executing the next maintenance task; and directing, by the first storage unit, execution of the next maintenance task by the corresponding one of the associated storage units.

11. The method of claim 10, wherein the directing execution of the next maintenance task by the corresponding one of the associated storage units is performed by sending a message or command to the corresponding one of the associated storage units.

12. The method of claim 10 further comprises facilitating, by the first storage unit based on the ordered list of maintenance tasks, coordination of a next maintenance task of the ordered list of pending maintenance tasks with a corresponding storage unit; and directing, by the first storage unit, execution of the next maintenance task by the corresponding storage unit until all pending maintenance tasks have been completed or no additional pending maintenance tasks can be completed.

13. The method of claim 12, wherein the no additional pending maintenance tasks can be completed reflects one or more storage units being unavailable to execute one or more pending maintenance tasks.

14. The method of claim 12, wherein the no additional pending maintenance tasks can be completed reflects a storage unit executing destructive maintenance tasks being unavailable.

15. The method of claim 10, wherein the pending maintenance tasks are any of: storage upgrades, storage expansion, removing storage, moving data slices, or deleting data slices.

16. The method of claim 10, wherein the pending maintenance tasks include one or more of: a patch, a full upgrade, or a configuration change.

17. The method of claim 10 further comprises:
detecting an online status of a task management unit;
facilitating, based on an ordered list of pending maintenance tasks, coordination of a next maintenance task with a corresponding storage unit; and
directing execution of the next maintenance task by the corresponding storage unit.

18. A distributed storage network (DSN) comprises:
a distributed storage and task processing network (DSTN) task management unit with first processing circuitry configured to execute operational instructions to:
create a layered queue with an ordered list of maintenance tasks; and
facilitate dissemination of the maintenance tasks within the layered queue to a corresponding storage unit executing at least a specific one of the maintenance tasks; and
a second computing device with second processing circuitry configured to execute operational instructions to:
detect an offline status of the DSTN task management unit;
select a first storage unit from a plurality of associated storage units, the first storage unit capable of tabulating storage pool health and capable of taking over task organizing logic performed by the task management unit;
aggregate, by the first storage unit, pending maintenance tasks of the disseminated maintenance tasks of corresponding storage units into an ordered list of pending maintenance tasks;
facilitate, by the first storage unit based on the ordered list of pending maintenance tasks, coordination of a next maintenance task of the pending maintenance tasks with a corresponding storage unit;
determine, by the first storage unit, to perform the next maintenance task as a result of a predicted impact of performing the next maintenance task being less than an impact threshold level, wherein the predicted impact comprises an estimated storage reliability level resulting from executing the next maintenance task; and
direct, by the first storage unit, execution of the next maintenance task by the corresponding storage unit.

19. The distributed storage network (DSN) of claim 18 further configured to:
detect an online status of the DSTN task management unit;
facilitate, by the DSTN task management unit, based on the ordered list of pending maintenance tasks, coordination of a next maintenance task with a corresponding storage unit; and
direct execution of the next maintenance task by the corresponding storage unit.

20. The distributed storage network (DSN) of claim 18, wherein the estimated storage reliability level is based on a reliability of a storage vault in which the corresponding storage unit participates, with the corresponding storage unit being unavailable.

* * * * *